United States Patent [19]
Kishi et al.

[11] Patent Number: 5,225,960
[45] Date of Patent: Jul. 6, 1993

[54] CERAMIC CAPACITOR AND METHOD FOR THE PREPARATION THEREOF

[75] Inventors: Hiroshi Kishi; Hiroshi Saito; Hisamitsu Shizuno; Yuji Nishi; Katsuhiko Arai, all of Tokyo, Japan

[73] Assignee: Taiyo Yuden Kabushikigaisha, Tokyo, Japan

[21] Appl. No.: 851,510

[22] Filed: Mar. 16, 1992

[30] Foreign Application Priority Data

Mar. 16, 1991 [JP] Japan ................................. 3-76951

[51] Int. Cl.$^5$ ........................... H01G 4/10; H01G 7/00
[52] U.S. Cl. ........................................ 361/321; 29/25.42
[58] Field of Search ............... 361/320, 321; 501/134; 29/25.42; 252/62.3 BT; 264/61, 63

[56] References Cited

U.S. PATENT DOCUMENTS

| | | | |
|---|---|---|---|
| 4,987,107 | 1/1991 | Narumi et al. | 501/137 |
| 5,014,158 | 5/1991 | Nishimura et al. | 361/321 |
| 5,064,596 | 11/1991 | Chida et al. | 264/63 X |
| 5,082,810 | 1/1992 | Bergna et al. | 501/134 |

Primary Examiner—Donald A. Griffin
Attorney, Agent, or Firm—Townsend, Snider & Banta

[57] ABSTRACT

Disclosed is a ceramic capacitor of a mono-layer structure or a multi-layer structure, which has characteristic X7R (characteristic B) and which is high in reliability in direct current breakdown voltage at 125° C. and small in size. The ceramic capacitor has a dielectric layer and internal electrodes disposed so as to interpose the dielectric layer. The dielectric layer is composed of a sintered body of ceramic particles whose core sections are made mainly of $BaTiO_3$ and whose shell sections are made from $BaTiO_3$ in the form of a solid solution composed of an oxide of one or more than one element selected from Mg, Ca, Sr and Zn and an oxide of one or more than one element selected from Sc, Y, Gd, Dy, Ho, Er, Yb, Tb, Tm and Lu.

11 Claims, 5 Drawing Sheets

CERAMIC CAPACITOR AND METHOD FOR THE PREPARATION THEREOF

BACKGROUND OF THE INVENTION

1. Field of the Invention

The present invention relates to a ceramic capacitor and a method for the preparation of the ceramic capacitor and, to more particularly, to a ceramic capacitor of a mono-layer structure or of a multi-layer structure, having one or more than one dielectric layer composed of a dielectric ceramic composition containing $BaTiO_3$ as a major component and two or more than two internal electrodes so disposed as to interpose the dielectric layer.

2. Description of the Related Art

Ceramic capacitors of a multi-layer structure are generally formed by alternately laminating a non-sintered ceramic sheets for forming dielectric layers and conductive paste films and baking the laminated dielectric layers and conductive paste films at temperatures ranging from 1,300° C. to 1,600° C. in oxidative atmosphere. Hence, expensive metals as are not oxidized upon baking in oxidative atmosphere, such as platinum or palladium, are employed as material for the internal electrode, thereby making costs of ceramic capacitors expensive.

In order to reduce the costs of the ceramic capacitors, it is considered to use a base metal, such as Ni or the like, as the material for the internal electrodes and to bake the base metal in reductive atmosphere to prevent the oxidation of the base metal. It is to be noted, however, that desired dielectric ceramic compositions having sufficiently high electrical characteristics cannot be produced by baking material of the dielectric ceramic compositions so far known in reductive atmosphere.

For example, Japanese Patent Laid-open Publication (kokai) No. 61-275,164 discloses dielectric ceramic compositions having a high dielectric constant yet a small rate of change of temperatures of capacitance which can be produced by baking powder of raw material obtainable by adding $Nb_2O_5$ and $Co_2O_3$ to $BaTiO_3$, in oxidative atmosphere. It is to be noted, however, that the baking of such powder of the raw material in such reductive atmosphere cannot produce the dielectric ceramic composition having desired electrical characteristics because the baked body may become readily converted into semi-conductors.

Japanese Patent Publication (kokoku) Nos. 61-14,607-14,611 and 62-1,595-1,596 propose dielectric ceramic compositions, obtainable by baking in reductive atmosphere, having a high dielectric constant yet a small rate of change in temperatures of the capacitance. Further, our Japanese Patent Application Nos. 1-311,094-98, 2-314,754-56, 1-315,981-83, 2-16,345, 2-76,761-68 and 2-76,773-776 propose improvements in various electric characteristics of the dielectric ceramic compositions.

The dielectric ceramic compositions as proposed by those patent applications as described hereinabove contain, as a first basic component, a component as represented by $(Ba_{k-x}M_x)O_k(Ti_{1-y}R_y)O_{2-y/2}$. As a second basic component, there may optionally be employed a component as represented by $CaZrO_3$ or $BaZrO_3$. Further, as a first additive component, there may be employed $Li_2O\text{-}SiO_2\text{-}MeO$ or $B_2O_3\text{-}SiO_2\text{-}MeO$, while at least one of $Cr_2O_3$ and $Al_2O_3$ may optionally be employed as a second additive component.

Recently, however, very strong demands have been made to minimize laminated ceramic capacitors as electronic circuit becomes highly dense. For making laminated ceramic capacitors compact, there are known many processes for reducing the thickness of the dielectric layers and for increasing the number of layers to be laminated. If the dielectric layer becomes too thin, however, the direct current breakdown voltage may deviate and reliability in the withstand voltage of the ceramic capacitor cannot be maintained.

For instance, for laminated ceramic capacitors requiring for characteristic X7R (characteristic B), reliability in the direct current breakdown voltage particularly at the highest temperature as high as 125° C. places particular significance. However, reducing the thickness of the dielectric ceramic compositions disclosed in the aforesaid patent applications to deviation in the direct current breakdown voltage at 125° C. and makes it impossible to maintain the reliability in the withstand voltage at that temperature.

SUMMARY OF THE INVENTION

The object of the present invention is to provide ceramic capacitors of a mono-layer structure or of a multi-layer structure and a method for the preparation of small-sized ceramic capacitors having high reliability in the direct current breakdown voltage at 125° C.

Other objects, features and advantages of the present invention will become apparent in the course of the description of the preferred embodiments, which follows, with reference to the accompanying drawings.

DESCRIPTION OF THE PREFERRED EMBODIMENTS

The ceramic capacitor according to the present invention has a dielectric layer composed of one or more than one dielectric ceramic composition and two or more than two internal electrodes formed so as to interpose the dielectric layer there between. The dielectric ceramic composition is composed of a sintered body of a ceramic particle whose core section is composed mainly of $BaTiO_3$ and whose shell section is composed of $BaTiO_3$ in the form of a solid solution containing an oxide of one or more than one element selected from Mg, Ca, Sr and Zn and an oxide of one or more than one element selected from Sc, Y, Gd, Dy, Ho, Er, Yb, Tb, Tm and Lu.

The core section of the ceramic particle is intended to mean an inner section of the ceramic particle and the shell section of the ceramic particle is intended to mean an outer shell section thereof. The shell section of the particle ceramic may optionally be composed of a solid solution of $ZrO_2$. Further, the internal electrode may be composed of conductive material containing Ni as a major component or composed of another metal.

The method for the preparation of the ceramic capacitor according to the present invention comprises a step of preparing powder of the raw material as the basic component, a step of calcining the powder of the raw material at a predetermined temperature, a step of forming a slurry by mixing the calcined raw material powder of the basic component with powder of the additive component and an inorganic binder, a step of forming the slurry in the form of a sheet to give a non-sintered ceramic sheet and formulating a laminated body by forming a conductive paste film so as to interpose the non-sintered ceramic sheet, there between step of baking the laminated body in a non-oxidative atmosphere, and a step of heating the laminated body in an oxidative atmosphere. The basic component may be composed of $BaTiO_3$ as a major component, one or more than one oxide selected from MgO, CaO, SrO and ZnO, an oxide as represented by $R_2O_3$ (wherein R is one or more than one elements selected from Sc, Y, Gd, DY, Ho, Er, Yb, Tb, Tm and Lu), and BaO and/or $TiO_2$ which are/is added so as to amount to $1.00 \leq k \leq 1.04$ (wherein k is a ratio by mole of (Ba+Mg+Ca+Sr+Zn) to (Ti+R), i.e. (Ba+Mg+Ca+Sr+Zn)/(Ti+R)). The additive component is composed of $Li_2O$-$SiO_2$-MeO or $B_2O_3$-$SiO_2$-MeO (wherein Me is one or more than one element selected from Ba, Ca, Sr, Mg and Zn).

An alternative method for the preparation of the ceramic capacitor involves a step of preparing powder of the raw material as the first basic component, a step of calcining the powder of the raw material of the first component at a predetermined temperature, a step of forming a slurry by mixing the calcined raw material powder of the first basic component with powder of the second basic component, powder of an additive component and an organic binder, a step of forming the slurry in the form of a sheet to give a non-sintered ceramic sheet and formulating a laminated body by forming a conductive paste film so as to interpose there between the non-sintered ceramic sheet, a step of baking the laminated body in a non-oxidative atmosphere, and a step of heating the laminated body in an oxidative atmosphere. The first basic component may be composed of $BaTiO_3$ as a major component, one or more than one oxide selected from MgO, CaO, SrO and ZnO, powder of an oxide as represented by $R_2O_3$ (wherein R is one member selected from one or more than one element selected from Sc, Y, Gd, Dy, Ho, Er, Yb, Tb, Tm and Lu), and BaO and/or $TiO_2$ which are/is added so as to amount to $1.00 \leq k \leq 1.04$ (wherein k is a ratio by mole of (Ba+Mg+Ca+Sr+Zn) to (Ti+R)). The second basic component is composed of $CaZrO_3$ and/or $BaZrO_3$. The additive component is composed of $Li_2O$-$SiO_2$-MeO or $B_2O_3$-$SiO_2$-MeO (wherein Me is one or more than one element selected from Ba, Ca, Sr, Mg and Zn).

In the two methods for the preparation of the ceramic capacitors as described hereinabove, the raw material of the basic component is not restricted to the oxides and it may include any compound, such as a carbonate or the like, that can be converted into an oxide by baking.

The additive component may include ones containing optionally $Cr_2O_3$ and/or $Al_2O_3$. Although the conductive paste may be formed with material containing Ni as a major component, a metal other than Ni may also be employed.

In the two methods as described hereinabove, the temperatures at which the first basic component is calcined may preferably range from 800° C. to 1,100° C. If the calcining temperature is lower than 800° C., on the one hand, the decomposition of $BaCO_3$ or the like proceeds to an insufficient extent and the reaction is likely to be carried out in an irregular fashion. If the calcining temperature exceeds 1,100° C., on the other hand, the growth of particles and aggregation would start, thereby causing a decrease in the sintering ability.

It is preferred to use $BaTiO_3$ as the first basic component in the purity as high as 99% or higher and having an average particle size ranging from 0.5 micron to 2.0 microns. If the particle size would be smaller than 0.5 micron, the reaction may proceed too much, thereby converting the first basic component into a solid solution. If the particle size would become larger than 2.0 microns, the sintering ability may be decreased. The reason for setting the ratio by mole (k=(Ba+Mg+Ca+Sr+Zn)/(Ti+R)) to $1.00 \leq k \leq 1.04$ is because the dielectric ceramic composition is converted into semi-conductor when k is smaller than 1.00, on the one hand, and the dielectric body suffers from the difficulty of becoming dense when k is larger than 1.04, on the other hand.

In conventional methods for the preparation of ceramic capacitors, all components of raw material are mixed together to carry out the reactions concurrently when the first basic component as represented by $(Ba_{k-x}M_x)O_k(Ti_{1-y}R_y)O_{2-y/2}$, thereby making the reaction likely to occur in an irregular fashion as well as localizing particularly small components, i.e. a component M (such as Ca, Sr, Mg or Zn) and a component R (such as Sc, Y, Gd, Dy, Ho, Er, Yb, Tb, Tm or Lu) in the dielectric ceramic composition and deviating from the composition to a great extent.

On the other hand, the present invention can suppress the composition of the components M and R from deviating by carrying out the reaction uniformly between $BaTiO_3$ and the additive components because Ba, the component M, Ti, and the component R are added to the previously synthesized $BaTiO_3$ at predetermined rates and the mixture is then heated.

The present invention will be described more in detail by way of examples.

EXAMPLE 1

A pot mill was charged with 0.96 part by mole of $BaTiO_3$ synthesized previously, 0.05 part by mole of MgO, 0.01 part by mole of ZnO, 0.03 part by mole of $TiO_2$ and 0.005 part by mole of $Ho_2O_3$, each component having purity of 99% or higher, together with alumina balls and 2.5 liters of water, and the resulting mixture was stirred for 15 hours.

The resulting mixture was charged into a stainless pot and dried at 150° C. for 4 hours with a hot air dryer and the dry mixture was then pulverized to rough particles which in turn were calcined in air at approximately 1,000° C. for 2 hours with a tunnel oven, thereby yielding powder of the first basic component as represented by $(Ba_{0.96}Mg_{0.05}Zn_{0.01})O_{1.02}(Ti_{0.99}Ho_{0.01})O_{1.995}$.

Then, 98 parts by mole of the powder of the first component and 2 parts by mole of powder of $CaZrO_3$ as the second basic component were weighed, and 2 parts by weight of $0.20Li_2O-0.60SiO_2-0.04SrO-0.10MgO-0.06ZnO$ were added to 100 parts by weight of the mixture of the basic components, followed by addition of 15% by weight of an organic binder consisting of an aqueous solution of acrylic ester polymer, glycerin and condensed phosphate salt and then 50% by weight of water to the resulting mixture of the basic and additive components. The resulting mixture was then pulverized and mixed in a ball mill to give a slurry.

The resulting slurry was defoamed with a vacuum defoamer and then transferred to a reverse roll coater, thereby forming a thin coat on a long polyester film. The thin coat formed on the polyester film was then heated and dried at 100° C., thereby yielding a non-sintered ceramic sheet having the film thickness of approximately 25 microns. The sheet was then cut to give a square sheet having a 10 cm side each.

On the other hand, the conductive paste for the internal electrode was prepared by dissolving 10 grams of nickel powder having an average particle size of 1.5 microns and 0.9 gram of ethyl cellulose in 9.1 grams of butyl carbitol and stirring the resulting mixture for 10 hours with a stirrer. The resulting conductive paste was then printed on one side of the non-sintered ceramic sheet through a screen having 50 patterns, each being 14 mm long and 7 mm wide, and the coat formed on the ceramic sheet was dried.

Thereafter, one non-sintered ceramic sheet was laminated on another non-sintered ceramic sheet with each printed side directed upward. In this instance, the adjacent sheets were laminated so as for the upper sheet to be superimposed on the lower sheet in a staggered arrangement by nearly half of one, pattern in the lengthwise direction, thereby forming a laminated body. Further, four non-sintered ceramic sheets having a thickness of 60 microns were laminated on each of both surfaces of the laminated body, and the sheets were pressed to attach to each other by application of the temperature of nearly 50° C. and the vertical load of approximately 40 tons. Thereafter, the resulting laminated body was then cut in a lattice form, thereby giving fifty laminated body chips.

The chips were then placed in an oven and the temperature of the atmosphere within the oven was elevated at the rate of 100° C. per hour to 600° C., thereby burning the organic binder. Thereafter, the atmosphere in the oven was changed from the atmosphere in air to reductive atmosphere containing $H_2$ (2% by volume)+$N_2$ (98% by volume).

While the oven was held in such reductive atmosphere, the laminated body chips were heated from 600° C. to the sintering temperature as high as 1,150° C. at the rate of 100° C. per hour. After they were held at the maximum temperature, i.e. 1,150° C. for three hours, the temperature was cooled down to 600° C. from 1,150° C. at the rate of 100° C. per hour, followed by replenishing the atmosphere in the oven with atmosphere in air (oxidative atmosphere) in which the oxidation was carried out at 600° C. for 30 minutes. Thereafter, the chips were cooled down to room temperature, thereby yielding laminated sintered body chips.

The side surfaces of the laminated sintered body chip with the electrodes exposed to the outside were coated with a conductive paste consisting of zinc, glass frit and a vehicle, and then dried. The chips were then baked at 550° C. for 15 minutes in air, thereby forming zinc electrode layers and further forming a copper layer on the zinc electrode layers by means of electroless plating method, followed by the formation of Pb-Sn soldering layer thereon by means of electric plating method to thereby formulate a pair of external electrodes.

Figure 4:
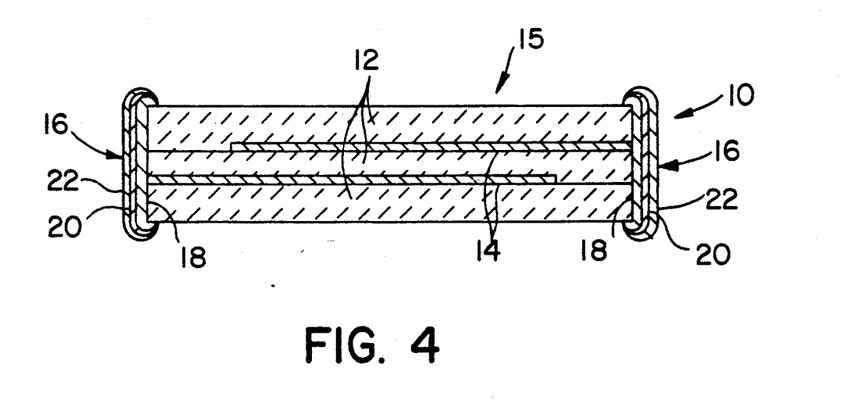
FIG. 4 is a sectional view showing the ceramic capacitor according to Example 1.

The aforesaid procedures gave a laminated ceramic capacitor 10 having a pair of the external electrodes 16 formed on the laminated sintered body chip 15 composed of three dielectric ceramic layers 12 and two-layered inner electrodes 14, as shown in FIG. 4. The external electrode comprises a zinc electrode layer 18, a copper layer 20 formed on the zinc electrode layer 18, and a Pb-Sn soldering layer 22 formed on the copper layer 20.

It is to be noted herein that the thickness of the dielectric ceramic layer of the laminated ceramic capacitor 10 was found to be 0.02 mm and the area of the internal electrodes, which overlaps with each other, was 25 $mm^2$ (5 mm × 5 mm). It is further to be noted herein that the composition of the dielectric layer 12 subsequent to sintering is substantially identical to a combination of the compositions of the basic components and the additive component prior to sintering.

The laminated ceramic capacitor 10 was measured for its electrical characteristics. As a result, the laminated ceramic capacitor 10 was found to have a dielectric constant $\epsilon_s$ of 3,950, dielectric loss, tan $\delta$, of 1.2%, electrical resistivity $\rho$ of $5.3 \times 10^6$ MΩ·cm, change rates of capacitance at $-55°$ C. and $+125°$ C. when based on the capacitance at 25° C., i.e. $\Delta C_{-55}$ and $\Delta C_{125}$, of $-10.1\%$ and $+3.5\%$, respectively, change rates of capacitance at $-25°$ C. and $+85°$ C. when based on the capacitance at 20° C., i.e. $\Delta C_{-25}$ and {$C_{85}$, of $-3.6\%$ and $-4.2\%$, respectively, an average direct current breakdown voltage at 125° C. of 64 V/micron, and a minimum direct current breakdown voltage at 125° C. of 55 V/micron.

The aforesaid electrical characteristics were measured in the following manner.

Dielectric constant $\epsilon_s$: The capacitance was measured at the temperature of 20° C., frequency of 1 kHz and voltage (effective value) of 1.0 V. The dielectric constant $\epsilon_s$ is then computed from the measured value, the facing area (25 $mm^2$) of a pair of internal electrodes 14, and the thickness (0.02 mm) of a dielectric ceramic layer 12 interposed between the pair of the internal electrodes 14.

Dielectric loss tan $\delta$: The dielectric loss, tan $\delta$ (%), was measured under the same conditions as the dielectric constant $\epsilon_s$.

Electrical resistivity $\rho$ (MΩ·cm): The resistance value between a pair of the external electrodes was measured after application of direct current voltage of 100 V at 20° C. for 1 minute, and the electrical resistivity was measured from the measured value and a dimension.

The temperature characteristics of the capacitance was measured by measuring the capacitance of an sample placed in a thermostat at the frequency of 1 kHz and the voltage (effective value) of 1.0 volt and temperatures of $-55°$ C., $-25°$ C., 0° C., $+20°$ C., $+25°$ C., $+40°$ C., $+60°$ C., $+85°$ C., $+105°$ C. and $+125°$ C. and computing the rates of change at each temperature relative to the capacitance at 20° C. and 25° C.

Direct current breakdown voltage at 125° C.: Twenty samples were immersed in a silicon oil at 125° C. and the voltage was measured immediately before each of the samples was broken down when the direct current voltage was applied to the sample at the rate of 100 volts per second, i.e. before the passage of the current of 0.1 mA. The direct current breakdown voltage at 125° C. was then computed from the measured voltage per micron of the film thickness of the dielectric layer.

Comparative Example 1

The first basic component was prepared by calcining 0.05 part by mole of MgO, 0.01 part by mole of ZnO, 0.96 part by mole of $BaCO_3$, 0.99 part by mole of $TiO_2$ and 0.005 part by mole of $Ho_2O_3$ at 1,200° C. As the second basic component was employed $CaZrO_3$. To 98 parts by mole of the first basic component were added 2 parts by mole of the second basic component. To 100 parts by weight of the mixture of the first and second basic components were added 2 parts by weight of an additive component as represented by $0.20Li_2O$-$0.60SiO_2$-$0.04SrO$-$0.10MgO$-$0.06ZnO$. Then, a slurry was prepared by mixing the mixture of the basic components and the additive component with an organic binder. A laminated ceramic capacitor was prepared from the resulting slurry in the same manner as in Example 1 and measured for its electrical characteristics in the same manner as in Example 1. The results are shown in Table 2 below.

EXAMPLE 2

As the raw material for a basic component, there were employed 0.96 part by mole of $BaTiO_3$, 0.03 part by mole of MgO, 0.01 part by mole of ZnO, 0.01 part by mole of $CaCO_3$, 0.01 part by mole of $SrCO_3$, 0.02 part by mole of $TiO_2$, and 0.01 part by mole of $Er_2O_3$. To 100 parts by weight of the basic component were added 2 parts by weight of an additive component as represented by $0.30Li_2O$-$0.45SiO_2$-$0.25SrO$. An ceramic capacitor was prepared in the same manner as in Example and then measured for its electric characteristics. The results are shown in Table 2 below.

Comparative Example 2

The first basic component was prepared by calcining 0.03 part by mole of MgO, 0.01 part by mole of ZnO, 0.01 part by mole of $CaCO_3$, 0.01 part by weight of $SrCO_3$, 0.96 part by mole of $BaCO_3$, 0.98 part by mole of $TiO_2$ and 0.01 part by mole of $Er_2O_3$ at 1,200° C. To 100 parts by weight of the basic component were added 2 parts by weight of an additive component as represented by $0.30Li_2O$-$0.45SiO_2$-$0.25SrO$. Then, a slurry was prepared by mixing the mixture of the basic component and the additive component with an organic binder. A laminated ceramic capacitor was prepared from the resulting slurry in the same manner as in Example 1 and measured for its electrical characteristics in the same manner as in Example 1. The results are shown in Table 2 below.

EXAMPLE 3

The basic component was prepared by employing 0.98 part by mole of $BaTiO_3$, 0.005 part by mole of MgO, 0.005 part by mole of $SrCO_3$, 0.01 part by mole of BaCO, and 0.01 part by mole of $Yb_2O_3$, as the first basic component, and $BaZrO_3$, as the second basic component, at the rate of 2 parts by mole of the second basic component relative to 98 parts by mole. To 100 parts by weight of the basic components were added an additive component as represented by $0.20B_2O_3$-$0.50SiO_2$-$0.30MgO$. A ceramic capacitor was prepared in substantially the same manner as in Example 1 and the electrical characteristics for the resulting ceramic capacitor were measured in the same manner as in Example 1. The results are shown in Table 2 below.

Comparative Example 3

The first basic component was prepared by calcining 0.005 part by mole of MgO, 0.005 part by mole of $SrCO_3$, 0.99 part by weight of $BaCO_3$, 0.98 part by mole of $TiO_2$ and 0.01 part by mole of $Yb_2O_3$ at 1,200° C. To 98 parts by mole of the first basic component were added 2 parts by mole of $BaZrO_3$ as the second basic component. To 100 parts by weight of the mixture of the first and second basic components were added 0.5 part by weight of an additive component as represented by $0.20Ba_2O_3$-$0.50SiO_2$-$0.30MgO$. Then, a slurry was prepared by mixing the mixture of the basic component and the additive component with an organic binder. A laminated ceramic capacitor was prepared from the resulting slurry in the same manner as in Example 1 and measured for its electrical characteristics in the same manner as in Example 1. The results are shown in Table 2 below.

EXAMPLE 4

The basic component was prepared by employing 0.99 part by mole of $BaTiO_3$, 0.025 part by mole of $CaCO_3$, 0.005 part by mole of $SrCO_3$ and 0.005 part by mole of $Dy_2O_3$ as the first basic component, and $CaZrO_3$, as the second component at the rate of 2 parts by mole of the second basic component relative to 98 parts by mole of the first basic component. To 100 parts by weight of the mixture of the first and second basic component were added a first additive component as represented by $0.10B_2O_3$-$0.50SiO_2$-$0.08BaO$-$0.20CaO$-$0.12MgO$ at the rate of 2 parts by weight of the first additive component as well rate each of 0.1 part by weight. A laminated ceramic capacitor was prepared in the same manner as in Example 1. The electrical characteristics for the resulting ceramic capacitor were measured in the same manner as in Example 1, and the results are shown in Table 2 below.

Comparative Example 4

The first basic component was prepared by calcining 0.025 part by mole of $CaCO_3$, 0.005 part by mole of $SrCO_3$, 0.99 part by weight of $BaCO_3$, 0.99 part by mole of $TiO_2$ and 0.005 part by mole of $Dy_2O_3$ at 1,200° C. To 98 parts by mole of the first basic component were added 2 parts by mole of $CaZrO_3$ as the second basic component. To 100 parts by weight of the mixture of the first and second basic components were added 0.5 part by weight of a first additive component as represented by $0.10B_2O_3$-$0.50SiO_2$-$0.08BaO$-$0.20CaO$-$0.12MgO$. Further, as second additive components, 0.1 part by weight of $Cr_2O_3$ and 0.1 part by weight of $Al_2O_3$ were added to 100 parts by weight of the mixture of the first and second basic components. Then, a slurry was prepared by mixing the mixture of the basic component and the additive component with an organic binder. A laminated ceramic capacitor was prepared from the resulting slurry in the same manner as in Example 1 and measured for its electrical characteristics in the same manner as in Example 1. The results are shown in Table 2 below.

EXAMPLE 5

The basic component was prepared by employing 0.96 part by mole of $BaTiO_3$, 0.03 part by mole of MgO, 0.02 part by mole of $CaCO_3$, 0.01 part by mole of $BaCO_3$, 0.015 part by mole of $Y_2O_3$ and 0.005 part by mole of $Er_2O_3$. To 100 parts by weight of the basic component were added a first additive component as represented by $0.25Li_2O-0.50SiO_2-0.25BaO$ at the rate of 2 parts by weight of the first additive component as well as $Cr_2O_3$ and $Al_2O_3$ as second additive components at the rate each of 0.1 part by weight. A laminated ceramic capacitor was prepared in the same manner as in Example 1. The electrical characteristics for the resulting ceramic capacitor were measured in the same manner as in Example 1, and the results are shown in Table 2 below.

Comparative Example 5

The first basic component was prepared by calcining 0.03 part by mole of MgO, 0.02 part by mole of $CaCO_3$, 0.97 part by weight of $BaCO_3$, 0.96 part by mole of $TiO_2$, 0.015 part by weight of $Y_2O_3$ and 0.005 part by mole of $Er_2O_3$ at 1,200 To 98 parts by mole of the first basic component were added 2 parts by weight of a first additive component as represented by $0.25Li_2O-0.50SiO_2-0.25BaO$ as well as 0.1 part by weight of $Cr_2O_3$ and 0.9 part by weight of $Al_2O_3$, each serving as second additive components. Then, a slurry was prepared by mixing the mixture of the basic component and the additive components with an organic binder. A laminated ceramic capacitor was prepared from the resulting slurry in the same manner as in Example 1 and measured for its electrical characteristics in the same manner as in Example 1. The results are shown in Table 2 below.

TABLE 1

| | Basic Components | | | | | |
|---|---|---|---|---|---|---|
| | | Rates of First Component (in mole) | | | | |
| | Composition Formula | $BaTiO_3$ | MO | $R_2O_3$ | BaO | $TiO_2$ |
| Example 1 | $0.98\{(Ba_{0.96}Mg_{0.05}Zn_{0.01})O_{1.02} - (Ti_{0.99}Ho_{0.01})O_{1.995}\} + 0.02\ CaZrO_3$ | 0.96 | MgO 0.05 ZnO 0.01 | $Ho_2O_3$ 0.005 | — | 0.03 |
| Comparative Example 1 | | — | MgO 0.05 ZnO 0.01 | $Ho_2O_3$ 0.005 | 0.96 | 0.99 |
| Example 2 | $(Ba_{0.96}Mg_{0.03}Zn_{0.01}Ca_{0.01}Sr_{0.01})O_{1.02} - (Ti_{0.98}Er_{0.02})O_{1.99}$ | 0.96 | MgO 0.03 ZnO 0.01 CaO 0.01 SrO 0.01 | $Er_2O_3$ 0.01 | — | 0.02 |
| Comparative Example 2 | | — | MgO 0.03 ZnO 0.01 CaO 0.01 SrO 0.01 | $Er_2O_3$ 0.01 | 0.96 | 0.98 |
| Example 3 | $0.98\{(Ba_{0.99}Mg_{0.005}Sr_{0.005})O_{1.00} - (Ti_{0.98}Yb_{0.02})O_{1.99}\} + 0.02\ BaZrO_3$ | 0.98 | MgO 0.005 SrO 0.005 | $Yb_2O_3$ 0.01 | 0.01 | — |
| Comparative Example 3 | | — | MgO 0.005 SrO 0.005 | $Yb_2O_3$ 0.01 | 0.99 | 0.98 |
| Example 4 | $0.98\{(Ba_{0.99}Ca_{0.025}Sr_{0.005})O_{1.02} - (Ti_{0.99}Dy_{0.01})O_{1.995}\} + 0.02\ CaZrO_3$ | 0.99 | CaO 0.025 SrO 0.005 | $Dy_2O_3$ 0.005 | — | — |
| Comparative Example 4 | | — | CaO 0.025 SrO 0.005 | $Dy_2O_3$ 0.005 | 0.99 | 0.99 |
| Example 5 | $(Ba_{0.97}Mg_{0.03}Ca_{0.02})O_{1.02} - (Ti_{0.96}Y_{0.03}Er_{0.01})O_{1.98}$ | 0.96 | MgO 0.03 CaO 0.02 | $Y_2O_3$ 0.015 $Er_2O_3$ 0.005 | 0.01 | — |
| Comparative Example 5 | | — | MgO 0.03 CaO 0.02 | $Y_2O_3$ 0.015 $Er_2O_3$ 0.005 | 0.97 | 0.96 |

| | Additive Components | | |
|---|---|---|---|
| | First | | Second |
| | Part by Weight | Composition Ratio (by mole) | Part by Weight |
| Example 1 | 2 | 0.20 $Li_2O$—0.60 $SiO_2$—0.04 SrO—0.10 MgO—0.06 ZnO | — |
| Comparative Example 1 | 2 | 0.20 $Li_2O$—0.60 $SiO_2$—0.04 SrO—0.10 MgO—0.06 ZnO | — |
| Example 2 | 2 | 0.30 $Li_2O$—0.45 $SiO_2$—0.25 SrO | — |
| Comparative Example 2 | 2 | 0.30 $Li_2O$—0.45 $SiO_2$—0.25 SrO | — |
| Example 3 | 0.5 | 0.20 $B_2O_3$—0.50 $SiO_2$—0.30 MgO | — |
| Comparative Example 3 | 0.5 | 0.20 $B_2O_3$—0.50 $SiO_2$—0.30 MgO | — |
| Example 4 | 2 | 0.10 $B_2O_3$—0.50 $SiO_2$—0.08 BaO—0.20 CaO—0.12 MgO | $Cr_2O_3$ 0.1 $Al_2O_3$ 0.1 |
| Comparative Example 4 | 2 | 0.10 $B_2O_3$—0.50 $SiO_2$—0.08 BaO—0.20 CaO—0.12 MgO | $Cr_2O_3$ 0.1 $Al_2O_3$ 0.1 |
| Example 5 | 2 | 0.25 $Li_2O$–0.50 $SiO_2$–0.25 BaO | $Cr_2O_3$ 0.1 $Al_2O_3$ 0.9 |
| Comparative Example 5 | 2 | 0.25 $Li_2O$–0.50 $SiO_2$–0.25 BaO | $Cr_2O_3$ 0.1 $Al_2O_3$ 0.9 |

TABLE 2

| | Dielectric Constant $\epsilon_s$ | tan δ (%) | Electrical Resistivity ρ (MΩ·cm) | $\Delta C_{-55}$ (%) | $\Delta C_{125}$ (%) | $\Delta C_{-25}$ (%) | $\Delta C_{85}$ (%) | DC Breakdown Voltage (V/μm) | |
|---|---|---|---|---|---|---|---|---|---|
| | | | | | | | | Average Value | Minimum Value |
| Example 1 | 3950 | 1.2 | $5.3 \times 10^6$ | −10.1 | 3.5 | −3.6 | −4.2 | 64 | 55 |
| Comparative Example 1 | 3890 | 1.0 | $5.6 \times 10^6$ | −11.0 | 1.3 | −4.4 | −4.8 | 61 | 27 |
| Example 2 | 3530 | 1.1 | $3.3 \times 10^6$ | −9.5 | 3.6 | −4.5 | −4.1 | 65 | 57 |
| Comparative | 3490 | 1.1 | $3.2 \times 10^6$ | −11.0 | 3.3 | −5.6 | −4.5 | 60 | 25 |

TABLE 2-continued

|  | Dielectric Constant $\epsilon_s$ | tan δ (%) | Electrical Resistivity ρ (MΩ·cm) | $\Delta C_{-55}$ (%) | $\Delta C_{125}$ (%) | $\Delta C_{-25}$ (%) | $\Delta C_{85}$ (%) | DC Breakdown Voltage (V/μm) | |
|---|---|---|---|---|---|---|---|---|---|
|  |  |  |  |  |  |  |  | Average Value | Minimum Value |
| Example 2 |  |  |  |  |  |  |  |  |  |
| Example 3 | 4360 | 1.2 | $2.5 \times 10^6$ | −10.0 | 9.3 | −6.3 | 3.6 | 58 | 51 |
| Comparative Example 3 | 4300 | 1.1 | $2.7 \times 10^6$ | −10.7 | 8.9 | −7.1 | 3.9 | 55 | 33 |
| Example 4 | 3720 | 1.1 | $2.2 \times 10^6$ | −9.5 | 5.0 | −3.8 | −0.6 | 60 | 52 |
| Comparative Example 4 | 3660 | 1.1 | $1.7 \times 10^6$ | −10.8 | 4.0 | −5.0 | −2.4 | 58 | 35 |
| Example 5 | 3600 | 1.2 | $5.0 \times 10^6$ | −9.4 | 3.9 | −5.5 | −3.3 | 58 | 49 |
| Comparative Example 5 | 3480 | 1.1 | $5.4 \times 10^6$ | −10.5 | 3.7 | −6.7 | −3.8 | 55 | 33 |

As is apparent from Table 2 above, the results of comparison of Examples 1 with 5 to Comparative Examples 1 to 5 reveal that the minimum value of the direct current breakdown voltage of each of the ceramic capacitors at 125° C. are increased to a great extent, thereby causing a high decrease in deviation of the direct current breakdown voltage and increasing an average of the direct breakdown voltage.

The ceramic capacitors produced in Examples 1 to 5 were examined for the minute structure of their dielectric layers.

Samples of the ceramic capacitors were analyzed for the overall distribution of elements by an X-ray microanalyzer. As a result, it was found that no deviation in the large-scale distribution of the composition was recognized in any sample and that the distribution of the composition was uniform. On the other hand, the dielectric ceramic compositions prepared by conventional methods were found irregular in their overall compositions because the components M and R are localized usually as pieces as large as 1 to 2 microns.

The ceramic capacitors were further examined for the distribution of the composition of their crystal grains by means of the EDS (energy diffusion type X-ray spectroscopic analysis) using an analytical electron microscope. The analytical results reveal that a large number of crystal grains are of a so-called core-shell structure in which the composition of the inner section of the crystal grain is different from the composition of the outer section thereof.

Figure 1:
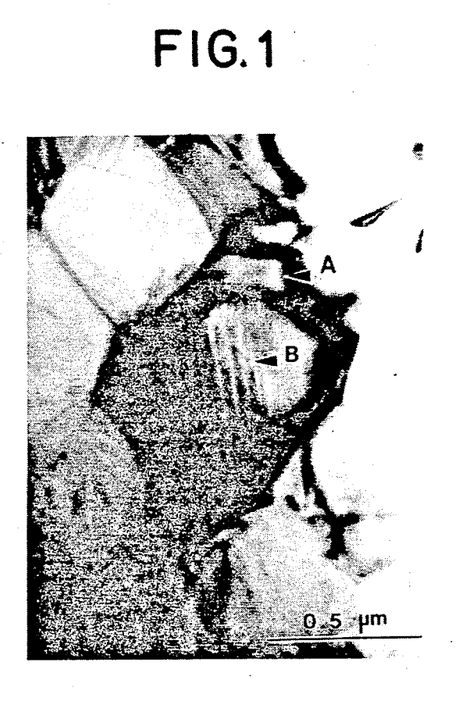
FIG. 1 is an electron microphotograph showing a dielectric ceramic composition according to Example 1.

FIG. 1 is an electron microphotograph of the sample of the ceramic capacitor prepared in Example 1. As is shown from the microphotograph of FIG. 1, a plurality of streaks of domain walls are shown in the core section (the section as indicated by the arrow A in FIG. 1) of the crystal grain. This indicates the existence of a highly dielectric domain in which the dipole moment is polarized in a particular direction. On the other hand, no such streaks are shown in the shell section (the section as indicated by the arrow B in FIG. 1) of the crystal grain.

Figure 2:
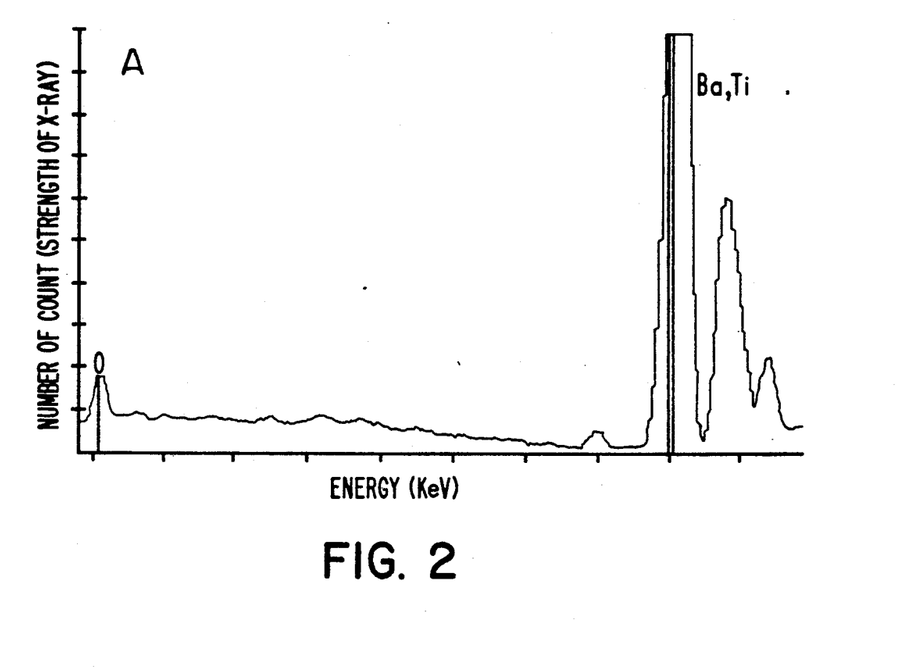
FIG. 2 is a graph showing an EDS spectrum of a core section of a ceramic particle of the dielectric ceramic composition according to Example 1.
Figure 3:
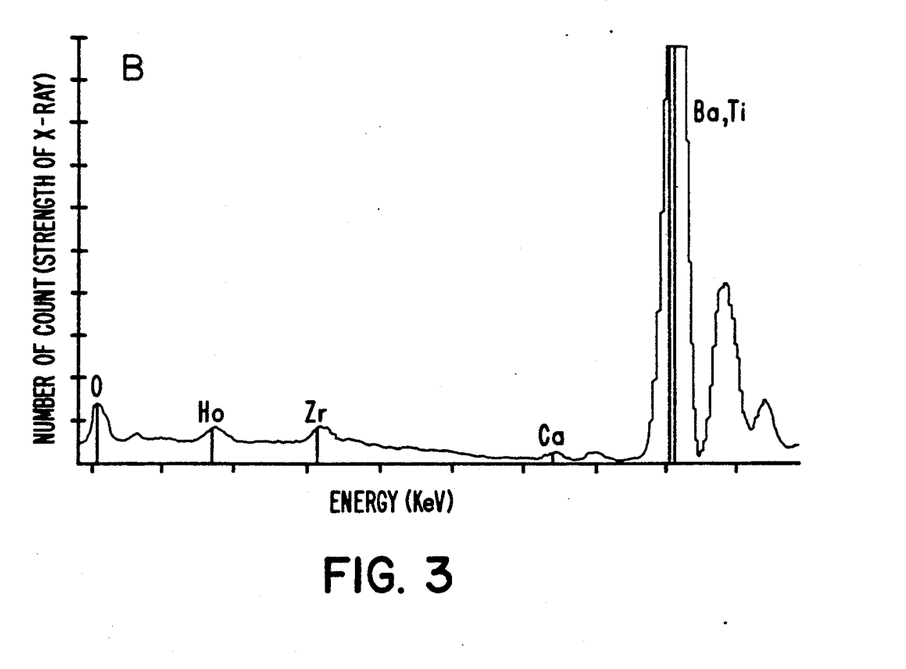
FIG. 3 is a graph showing an EDS spectrum of a shell section of a ceramic particle of the dielectric ceramic composition according to Example 1.

FIG. 2 is a graph showing the EDS spectrum of the section indicated by the arrow A in FIG. 1 and FIG. 3 is a graph showing the EDS spectrum of the section indicated by the arrow B in FIG. 1. The spectra of Ba and Ti alone are shown from the EDS spectrum of the core section A of the crystal grain as shown in FIG. 2, while the spectra of Ba, Ti, Ca, Zr, Ho and so on are shown from the EDS spectrum of the shell section of the crystal grain as shown in FIG. 3. In other words, it is found that the EDS spectrum of the shell section indicates such a structure that the components M and R as well as the CaZrO$_3$ component are partially diffused in the crystal grain of BaTiO$_3$.

As described hereinabove, the ceramic capacitor according to the present invention is such that the core section of the crystal grain is composed mainly of the BaTiO$_3$ component and the shell section of the crystal grain is composed of BaTiO$_3$ and a solid solution of the component M or R of the first basic component or composed of BaTiO$_3$ and a solid solution of the component M or R of the first basic component and ZrO$_3$ of the second basic component.

Further, samples of the ceramic capacitors prepared in Comparative Example 1 to 5 were observed for their minute structures by means of the analytical electron microscope in the same manner as described hereinabove for the samples thereof prepared in Examples 1 to 5. The microphotographs reveal that, although there are a number of crystal grains having a partial core-shell structure, the number of crystal grains having the clear core-shell structure is considerably lesser than that as shown for the samples of the ceramic capacitors prepared in Examples 1 to 5.

Figure 5:
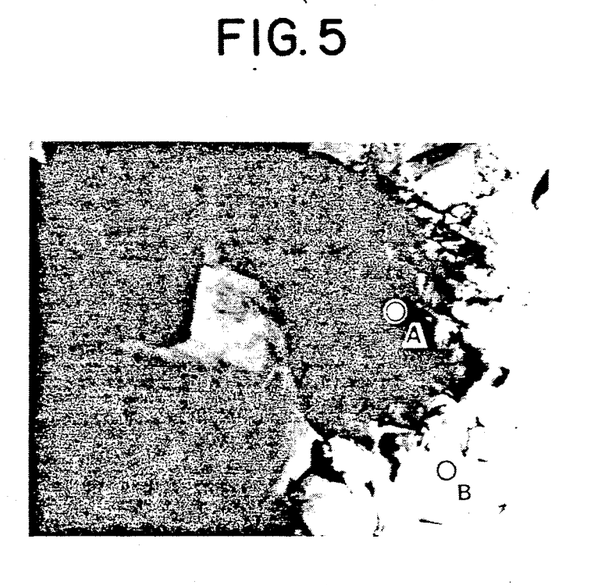
FIG. 5 is an electron microphotograph showing a sample of Comparative Example.
Figure 6:
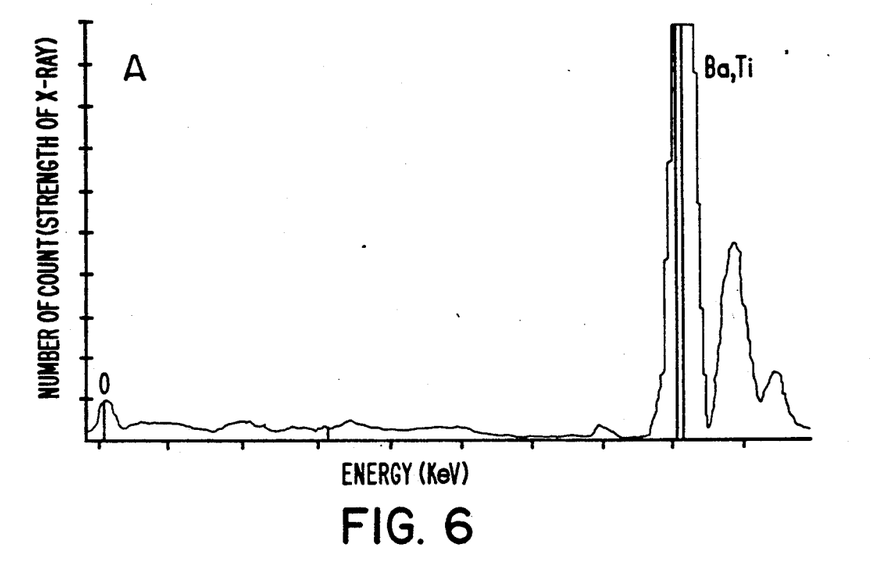
FIG. 6 is a graph showing an EDS spectrum of the section A of FIG. 5.
Figure 7:
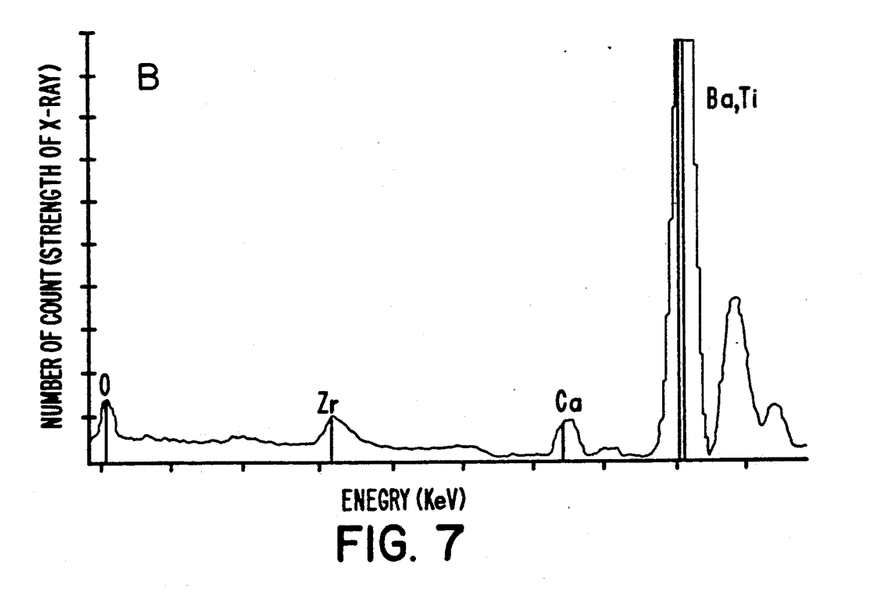
FIG. 7 is a graph showing an EDS spectrum of the section B of FIG. 5.

FIG. 5 is an electron microphotograph showing the sample of the ceramic capacitor prepared in Comparative Example. FIG. 6 is a graph showing the EDS spectrum of the section of FIG. 5 as indicated by the arrow A, and FIG. 7 is a graph showing the EDS spectrum of the section of FIG. 5 as indicated by the arrow B. As is shown in FIGS. 5 and 7, no solid solution of the component R (Ho) is shown in the section B corresponding to the shell section of the sample of the Comparative Example and the distribution of the component R is found irregular. It is to be noted that the irregular distribution of the component R may cause reduction to occur in local positions, thereby leading to a deviation in characteristics, i.e. reliability at high temperatures.

As described hereinabove, it is found that the ceramic capacitors prepared in Examples 1 to 5 according to the method of the present invention are less in deviation from the direct current breakdown voltage at 125° C. and flat in temperature characteristics because they have the dielectric layers in which no deviation in the distribution of the component M or R of the first basic component is found and the shell sections of the BaTiO$_3$ crystal grains are composed mainly of ceramic material with the component R or M of the first basic component and the second basic component diffused therein.

What is claimed is:

1. A ceramic capacitor having a dielectric layer composed of one or more than one dielectric ceramic composition and two or more than two internal electrodes so disposed as to interpose the dielectric layer, wherein:

the dielectric ceramic composition is composed of a sintered body of ceramic particles having crystal grains with a core section composed mainly of $BaTiO_3$ and a shell portion composed of crystal grains of $BaTiO_3$ in the form of a solid solution comprising an oxide of one or more than one elements M selected from the group consisting of Mg, Ca, Sr, and Zn, and on oxide as represented by $R_2O_3$, wherein R is one or more than on element selected from the group consisting of Sc, Y, Gd, Dy, Ho, Er, Yb, Tb, Tm and Lu and optionally $ZrO_2$, said ceramic particles having a structure as shown in the microphotograph of FIG. 1, with streaks domain walls in the core section, said shell sections having M and R in the crystal grains of $BaTiO_{3x}$ in the shell, with M and R components in the shell being substantially uniformly distributed.

2. A ceramic capacitor as claimed in claim 1, wherein the shell section of the ceramic particle is composed of $ZnO_2$ in the form of a solid solution.

3. A ceramic capacitor as claimed in claim 1, wherein the internal electrode is composed of material containing Ni as a major component.

4. The ceramic capacitor of claim 1, wherein the core section of the crystal grain is composed mainly of $BaTiO_3$ and the shell section is composed of $BaTiO_3$ and a solid solution of $ZrO_2$.

5. A process for the preparation of a ceramic capacitor comprising:

a step of preparing powder of raw material as basic component;

a step of calcining the powder of raw material as the basic component at a predetermined temperature;

a step of forming a slurry by mixing the calcined raw material powder with powder of an additive component and an organic binder;

a step of formulating the slurry into a sheet form, thereby forming a non-sintered ceramic sheet;

a step of yielding a laminated body by forming a conductive paste film so as to interpose the non-sintered ceramic sheet;

a step of baking the laminated body in a non-oxidative atmosphere; and a step of subjecting the laminated body to heat treatment in an oxidative atmosphere;

wherein the basic component comprises $BaTiO_3$ as a major component, one or more than one oxide selected from MgO, CaO, SrO and ZnO, an oxide as represented by $R_2O_3$, wherein R is one or more than one element selected from Sc, Y, Gd, Dy, Ho, Er, Yb, Tb, Tm and Lu, and BaO and/or $TiO_2$ so added as to amount to $1.00 \leq k \leq 1.04$, wherein k is a ratio by mole of $(Ba+Mg+Ca+Sr+Zn)$ to $(Ti+R)$; and wherein an additive component comprises $Li_2O\text{-}SiO_2\text{-}MeO$ or $B_2O_3\text{-}SiO_2\text{-}MeO$, wherein Me is one or more than one element selected from Ba, Ca, Sr, Mg and Zn.

6. A method as claimed in claim 5, wherein the conductive paste is formed with material containing Ni as a major component.

7. A method as claimed in claim 5, wherein the additive component comprises $Cr_2O_3$ and/or $Al_2O_3$.

8. A process for the preparation of a ceramic capacitor comprising:

a step of preparing powder of raw material as a first basic component;

a step of calcining the powder of raw material as the first basic component at a predetermined temperature; a step of forming a slurry by mixing the calcined first basic component with powder of raw material as a second basic component, an additive component and an organic binder;

a step of formulating the slurry into a sheet form, thereby forming a non-sintered ceramic sheet;

a step of yielding a laminated body by forming a conductive paste film so as to interpose the non-sintered ceramic sheet;

a step of baking the laminated body in a non-oxidative atmosphere; and a step of subjecting the laminated body to heat treatment in an oxidative atmosphere;

wherein the first basic component comprises $BaTiO_3$ as a major component, one or more than one oxide selected from MgO, CaO, SrO and ZnO, an oxide as represented by $R_2O_3$, wherein R is one or more than one element selected from Sc, Y, Gd, Dy, Ho, Er, Yb, Tb, Tm and Lu, and BaO and/or $TiO_3$ so added as to amount to $1.00 \leq k \leq 1.04$, wherein k is a molar ratio of $(Ba+Mg+Ca+Sr+Zn)$ to $(Ti+R)$;

wherein the second basic component comprises $CaZrO_3$ and/or $BaZrO_3$; and wherein an additive component comprises $Li_2O\text{-}SiO_2\text{-}MeO$ or $B_2O_3\text{-}SiO_2\text{-}MeO$, wherein Me is one or more than one element selected from Ba, Ca, Sr, Mg and Zn.

9. A method as claimed in claim 8, wherein the conductive paste is formed with material containing Ni as a major component.

10. A method as claimed in claim 8, wherein the additive component comprises $Cr_2O_3$ and/or $Al_2O_3$.

11. A dielectric ceramic composition composed of a sintered body of ceramic particles having an inner core section and an outer shell section, the core being composed mainly of $BaTiO_3$ and the shell section being composed of $BaTiO_3$ and a solid solution of one or more oxides, said composition having a structure as shown in the microphotograph of FIG. 1.

* * * * *

UNITED STATES PATENT AND TRADEMARK OFFICE
CERTIFICATE OF CORRECTION

PATENT NO. : 5,225,960  
DATED : July 6, 1993  
INVENTOR(S) : Hiroshi Kishi et al.

Page 1 of 1

It is certified that error appears in the above-identified patent and that said Letters Patent is hereby corrected as shown below:

Drawings,
Figure 1, delete label "A" and substitute therefore -- B --
Figure 1, delete label "B" and substitute therefore -- A --

Column 13,
Lines 6-7, delete "elements" and substitute therefore -- element --
Line 8, delete "on" and substitute therefore -- an --
Line 9, delete "on" and substitute therefore -- one --
Line 14, after "streaks" insert -- of --

Signed and Sealed this

Tenth Day of May, 2005

JON W. DUDAS
*Director of the United States Patent and Trademark Office*